Oct. 9, 1945.   G. A. LYON   2,386,226
WHEEL CONSTRUCTION
Filed Feb. 25, 1943
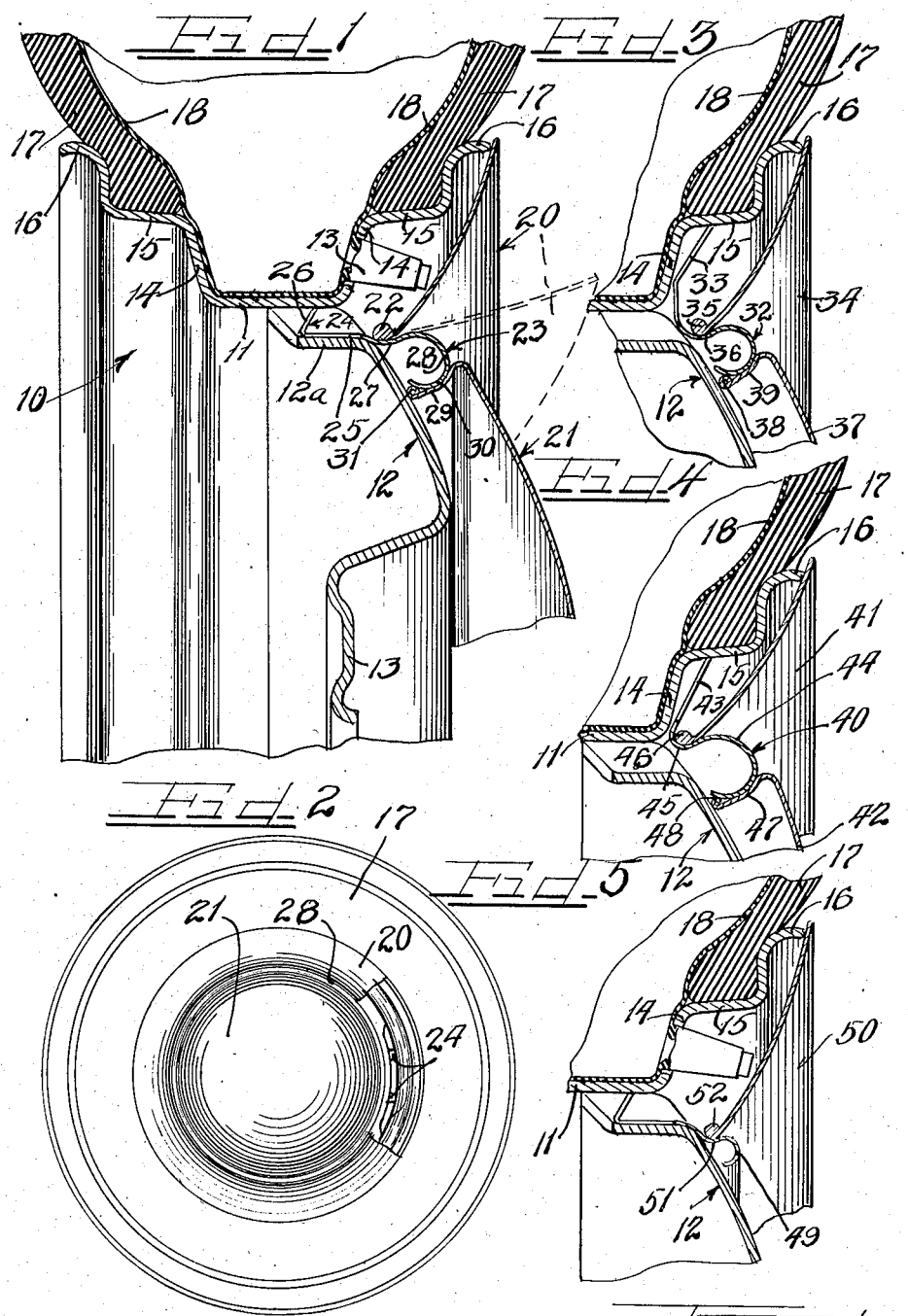
Inventor
George Albert Lyon
by Charles W. Hills Attys Patented Oct. 9, 1945

2,386,226

UNITED STATES PATENT OFFICE 2,386,226

WHEEL CONSTRUCTION

George Albert Lyon, Allenhurst, N. J.

Application February 25, 1943, Serial No. 477,000

5 Claims. (Cl. 301—37)

This invention relates to an improved wheel structure and is directed more particularly to an improved wheel trim assembly therefor and to improved retaining means for maintaining the wheel assembly on the wheel structure.

An important object of the invention is to provide a wheel cover member which is so constructed that the tire rim and the valve stem of the tire is effectively concealed and yet which is so constructed that the rear side of the cover member together with the valve is accessible without requiring removal of the cover member from the wheel.

Still another object of the invention is to provide an improved wheel structure including a cover member arranged to cover the outer side of the wheel rim of the wheel structure and having a cross-sectional configuration of such curvature and magnitude that it constitutes in effect a continuation of the side wall of the tire so as to give the appearance of being a part thereof and furthermore will if finished in white give the appearance of a massive tire having white side walls without requiring the expense of providing such a tire.

Still another object of the invention is to provide a wheel cover of the above character which may be constructed from synthetic plastic, rubber, either natural or synthetic, or other rubber-like material having characteristics which enable it to be deflected resiliently locally to provide access to the rear side of the cover member without requiring removal of said member.

Still another object of the invention is to provide an improved retaining assembly for maintaining the cover assembly upon the wheel structure.

Another and still further object of the invention is to provide, for a cover assembly including an outer annular portion and a central hub cap or disk portion, an improved retaining assembly so constructed and arranged that it cooperates with both portions of the cover assembly to retain the same in their assembled positions so that the cover portions are retained floatingly in concentric relationship and so that the retaining member is compressed between the cover portions thereby to increase the retaining action.

Still another object of the invention is to provide an improved retaining means for retaining a radially outer part and a central part of a wheel cover assembly upon a wheel structure in such a manner that it is resiliently compressed between the parts to retain them on the wheel structure in snap-on pry-off relationship.

In accordance with the general features of my invention there is provided herein a wheel structure including a central body or spider part and a tire rim mounted thereon, together with retaining means constructed to resiliently receive an outer annular part of a cover member in snap-on pry-off relationship by engagement of the inner periphery thereof and to resiliently receive a central hub cap portion in snap-on pry-off relationship by engagement with the outer peripheral part thereof, the retaining means being in itself resilient and thus maintaining the cover member in assembled relationship due to compressive action imposed thereon by the wheel cover parts.

In accordance with other features of my invention the retaining means may be adapted for retention of an outer cover portion constructed from rubber-like material whereby it may be locally resiliently flexed to afford access to the rear side thereof and may therefore be constructed to entirely cover the outer part of the wheel rim and to conceal the appurtenances associated with the wheel rim thus rendering these appurtenances accessible without requiring removal of the cover member from the wheel structure.

Other objects and advantages of the invention will become apparent from the following description and accompanying drawing in which Figure 1 is a fragmentary cross-sectional view of a wheel structure embodying one form of my invention;

Figure 2 is a side elevational view with parts broken away showing the form of my invention disclosed in Figure 1;

Figure 3 is a fragmentary cross-sectional view showing a modified form of my invention;

Figure 4 is a fragmentary cross-sectional view showing a further modified form of my invention; and Figure 5 is a fragmentary cross-sectional view showing still another modified form of my invention.

It is to be understood that the embodiments disclosed herein are for illustrative purposes only and may be changed or modified without departing from the spirit and scope of the invention as set forth in the appended claims.

As shown in Figure 1 the reference character 10 designates generally a multiflange, drop center type of tire rim which is connected as by riveting or welding or the like through a base flange 11 to a central body part or spider 12 which includes a central bolt on flange 13. The drop center rim 10 is provided with opposite side flanges 14, opposite intermediate flanges 15 and opposite edge portions 16. A suitable tire 17 having an inner tube 18 and a valve stem 19 is mounted upon the rim, one of the side walls 14 having an orifice through which the valve stem 19 may project.

The embodiment of the invention shown in Figure 1 includes a cover assembly comprising an outer annulus 20 and a central hub cap portion 21. The cover part 20, as indicated previously, may be constructed from synthetic plastic, rubber, either synthetic or natural, or some other substance having rubber-like characteristics whereby the cover portion 20 may be flexed locally away from the rim 10 to afford access to the tire valve 19 as disclosed in dotted lines in Figure 1.

With a cover portion so constructed it is now feasible to provide the cover with a cross-sectional configuration of such curvature and magnitude that it entirely conceals the outer part of the tire rim and the appurtenances such as the tire valve and wheel weights which are associated therewith. As shown in Figure 1 in order that the above concealment may be accomplished the cover portion 20 is so constructed that the outer periphery thereof extends at least to the edge portion 16 of the tire rim and radially inwardly to a part of the wheel spider 12.

As shown on the drawings the cover member 20 is provided at its inner peripheral edge with a reinforcing bead 22, this bead facilitating the attachment of the cover member to the wheel structure in a manner to be presently described.

To the end that the cover assembly may be securely retained in non-vibrating, detachable engagement there is provided herein a retaining member which may be in the form of individual clips but in the present instance is shown as an annulus which includes a retaining portion 23 and an attachment portion 24. The attachment portion shown in Figure 1 is particularly adapted to wheel structures in which spaces are provided around the junction between the axially inwardly disposed flange 12a of the body part 12 and the lowermost surface of the base flange 11 of the tire rim 10. In this construction the attachment portion 24 of the retaining member includes an axially inwardly extending arm 25 which terminates inwardly in an axially outwardly radially outwardly obliquely disposed member 26 the end of which bites into the lower surface of the base flange 11 after the retaining member has been placed against the wheel structure and the attachment portions thereof forced into the spaces between the wheel body part and the tire rim. It will be understood of course that the attachment portions 25 of the retaining member comprise spaced fingers disposed for registry with the aforementioned spaces between the wheel parts and as shown clearly in Figure 2. Preferably these fingers are disposed in four groups around the retaining part so that when stamped from sheet metal strips the waste will be reduced to a minimum.

The retaining portion 23 of the retaining member includes an annular bead which is so cross-sectional formed as to provide a radially outwardly extending groove 27 thereof adjacent the attachment portion 24, an axially outwardly curved surface portion 28 which may be highly polished or painted to give the desired ornamental appearance and a terminal portion which is formed to provide a resilient bead 29.

In assembling the cover structure upon the wheel it will be seen that the retaining portion 23 of the retaining member is bodily resilient with respect to the attachment portion 24 thereof and particularly the arm 25 of the attachment portion. Thus the outer annular cover portion 20 may be readily urged axially inwardly into the groove 27. Thereafter the hub cap portion 21 which is provided with an attachment flange 30 that terminates in a snap-on bead 31 may be urged axially inwardly with the bead overriding the axially inner rib or hub 29 of the retaining portion 23. The assembly of the hub cap member as above described is facilitated by the inherent resiliency of the retaining portion 23 of the retaining member, since the latter may be compressed to some degree to allow the snap-on engagement of the hub cap portion 21. After it is assembled as shown in Figure 1, it will be clearly seen that the hub cap portion 21, during its retention in assembled position, will serve to prevent radial flexing of the retaining portion 23 and thus the cover member 20 will be securely maintained in the groove 27 against axial outward movement therefrom.

With the foregoing construction it will be seen that the cover parts 20 and 21 will be securely retained upon the wheel structure by virtue of the compressive action they impose upon the retaining portion 23 of the retaining member. Furthermore it will be seen that while the cover portion 20 effectively conceals the outer portion of the tire rim and the appurtenances associated therewith and presents in effect a continuation of the side wall of the tire so as to give the appearance of being a part of the tire, the appurtenances on the tire rim will be readily available due to the local resilient flexing of the cover portion.

It is to be further noted that this flexing of the cover portion is greatly facilitated by the nature of its engagement with the retaining member. As will be seen from Figure 1 the inner peripheral edge of the cover member 20 is in no way interlocked or gripped by the retaining member and thus the bead 22 is free to pivot upon the retaining member in the groove 27 to further accommodate the flexing action above referred to.

A further aspect of the rubber-like qualities of the cover part 20 is that it may be snapped elastically over the retaining member into the groove 27 whereupon the retaining member will serve as a rigid backing for the bead 22.

In the construction shown in Figure 3 the retaining assembly is similar to that disclosed in the construction of Figure 1 with the exception that the attachment portion of the retaining member 32 comprises fingers 33 which bite into the radially inner surface of the intermediate flange 15 and thus may be adapted to assembly with the wheel structure in which the spaces between the base flange 11 and the flange 12a of the body part 12 are not available.

Here again the outer cover member 34 is provided with an inner peripheral bead 35 which is adapted to lock in a groove 36 of the retaining member 32 while the central hub cap portion 37 is adapted to have the bead 38 which serves as the terminal end of the snap-on flange 39 snapped on and over the radially inner portion of the retaining member 32. In this construction also the assembly of the central hub cap portion 37 urges the retaining member 32 radially outwardly to more securely engage the inner peripheral edge of the cover member 34.

In the construction shown in Figure 4 the retaining annulus 40 holds the outer cover member 41 and the hub cap portion 42 in a manner similar to those shown in Figures 1 and 3. In this construction the attachment fingers 43 of the retaining member also are disposed in biting engagement with the radially inner surface of the intermediate flange 15. The retaining portion 44 of the retaining member 40 is joined to the attachment fingers 43 by a re-entrant junction which forms a groove 45 into which the inner peripheral bead 46 of the cover member 41 may be lodged after it is urged over the axially outer portion of the retaining part 44.

In this construction also the central hub cap portion 42 is provided with a snap-on flange 47 terminating in a bead 48 which may be urged over the axially inwardly curled part of the retaining member 40. Here again the assembly of the hub cap portion 42 disposes the retaining member 40 under compression whereby the cover member 41 is securely retained in its assembled position against axially outward movement from the wheel structure.

In the constructions of Figures 3 and 4 as in the construction of Figure 1, the inner peripheral edge of the outer cover portion is engaged by the retaining member for free pivotal movement whereby the local flexure of the cover annulus due to its locally flexible rubber-like qualities is greatly augmented thus relieving the annulus from strain when it is flexed locally as shown in Figure 1 to render the rear side thereof accessible for inflating the tire or adjusting wheel balancing weights or the like.

In the event that a central ornamental member differing from that disclosed in Figures 1, 2, 3 and 4 is to be utilized the construction shown in Figure 5 may be availed of. In this form of the invention the retaining member differs from that disclosed in Figures 1 and 2 in that the hub cap is not utilized to urge the retaining portion 49 radially outwardly. Accordingly some provision must be made for retaining the rubber-like cover member 50 upon the wheel structure without the aid of a central hub cap portion. To this end the retaining member is so cross-sectionally configurated as to provide a somewhat deeper groove 51 for receiving the bead 52 formed at the inner peripheral edge of the cover member 50. In addition the cross-sectional dimensions of the retaining member 49 are considerably reduced. By this construction it is found that the increased depth of the groove and the reduced resiliency due to the reduction in the amount of metal in the retaining member considerably increases the retaining action of the member upon the inner peripheral margin of the cover part 50 while at the same time the above described pivot action between the bead on the inner peripheral margin of the cover member 50 and the retaining member is still available for augmenting the local flexure of the cover member to render the rear side thereof accessible.

It will be understood that while the retaining means disclosed herein is described in conjunction with my novel locally flexible, resilient outer cover portion the advantages thereof may also be availed of in use with a cover assembly in which all of the parts are so constructed that once assembled upon the wheel they are retained relatively inflexibly thereon until bodily removed for repairs or the like.

From the foregoing it will be seen that there is provided herein a wheel cover assembly which includes an outer portion constructed to have rubber-like characteristics enabling it to be locally resiliently flexed to afford access to the rear side thereof thus permitting the cover member to be disposed over the tire rim to conceal the entire outer side thereof and the appurtenances associated therewith and to constitute in effect a continuation of the side wall of a tire to give the appearance of being a part thereof and to give the appearance of being the white side wall of the tire if colored white, this cover portion being securely maintained on the wheel structure by novel retaining means which holds the cover on the wheel structure by virtue of its own resiliency and also by virtue of the abutment of the central hub cap portion thereagainst to compress the same between the cover parts. It will also be seen that there is provided herein retaining means having the aforementioned characteristics and furthermore which, during its retaining action, serves additionally as an ornamental trim member for disposition between the outer annular cover part and the central hub cap part.

I claim as follows:

1. In a wheel structure, an annular retainer member secured to the wheel and including a concealed, axially inwardly disposed set of resilient wheel engaging members and a substantially axially outwardly extending, bodily flexible retaining portion formed to support a cover assembly in disposition over the outer side of the wheel and over said resilient wheel engaging members.

2. In a wheel structure, a cover assembly including an outer annular part and a central hub cap portion for disposition over the outer side of the wheel structure in spaced concentric relationship, a retaining assembly for retaining said cover assembly over the outer side of the wheel structure including an attachment portion for engaging the wheel structure and a retaining portion resiliently associated with the attachment portion and having a cross-sectional configuration so as to present a radially outwardly extending portion for retainingly receiving the outer cover part of the cover assembly and a radially inwardly extending portion for retainingly receiving the hub cap portion, said radially inwardly extending portion being resiliently squeezed radially outwardly by said hub cap portion.

3. In a wheel structure, a cover assembly including an outer annular part and a central hub cap portion for disposition over the outer side of the wheel structure in spaced concentric relationship, a retaining assembly for retaining said cover assembly over the outer side of the wheel structure including an attachment portion for engaging the wheel structure and a retaining portion resiliently associated with the attachment portion and having a cross-sectional configuration so as to present a radially outwardly extending portion for retainingly receiving the outer cover part of the cover assembly and a radially inwardly extending portion for retainingly receiving the hub cap portion, said retaining portion being constructed to be resiliently compressed between the outer portion and the hub cap annular part of the cover assembly when engaged thereby.

4. In a retaining assembly for securing to a wheel structure a wheel cover assembly including an outer annular portion and a hub cap portion, an attachment portion for engaging the wheel structure and a retaining portion constructed to extend substantially axially outwardly thereof, said retaining portion being constructed to include a part presenting a radially outwardly extending groove for receiving the inner periphery of the outer cover portion, a part presenting a radially inwardly extending hump for receiving the outer edge of the hub cap portion and an intermediate part between said groove and said hump adapted to flex when said hub cap portion is retained thereon to secure the same to the wheel structure by virtue of compressive action.

5. In a wheel structure, a wheel cover assembly adapted for disposition over the outer part of the wheel and including an outer annular portion and a central hub cap portion, retaining means for detachably securing said annular member and said hub cap portion to the outer side of the wheel including an attachment part constructed to be secured to the wheel structure and a cover assembly retaining part secured to said attachment part for radial flexure relative thereto, said retaining part being constructed to be resiliently compressed in a radial direction relative to the wheel structure and being arranged to present a radially outwardly facing part for receiving the inner peripheral edge of the annular part of the cover assembly and a radially inwardly facing part for receiving the hub cap portion in detachable relationship, said radially outwardly and radially inwardly extending parts being connected by a loop like part constructed to be compressed radially when the cover portions are detachably secured on the retaining portion thereby to retain the same in concentric relationship upon the wheel.

GEORGE ALBERT LYON.